Aug. 16, 1938.       S. S. MATTHES       2,127,085
TROLLEY WIRE SUPPORT
Original Filed Jan. 17, 1936     2 Sheets-Sheet 1
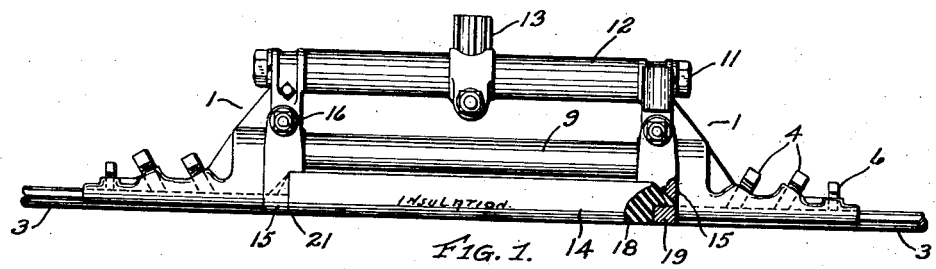
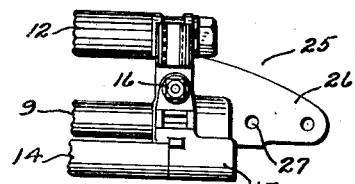
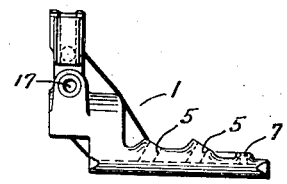
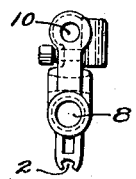
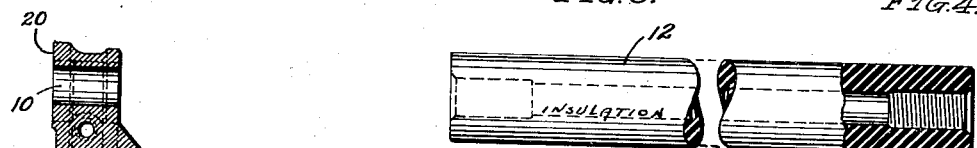
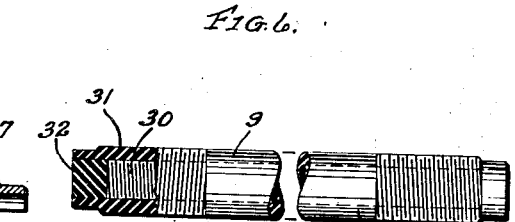
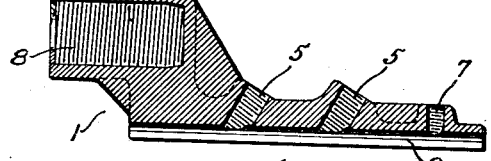
Inventor
SAMUEL S. MATTHES
By
Attorney Aug. 16, 1938.                S. S. MATTHES                2,127,085
                           TROLLEY WIRE SUPPORT
             Original Filed Jan. 17, 1936      2 Sheets-Sheet 2

Inventor
SAMUEL S. MATTHES.
By
                 Attorney.

Patented Aug. 16, 1938

2,127,085

UNITED STATES PATENT OFFICE 2,127,085

TROLLEY WIRE SUPPORT

Samuel S. Matthes, Mansfield, Ohio, assignor to The Ohio Brass Company, Mansfield, Ohio, a corporation of New Jersey Application January 17, 1936, Serial No. 59,538
Renewed September 24, 1937

12 Claims. (Cl. 191—39)

My invention relates to overhead trolley devices and in particular to those devices for supporting a trolley wire in an overhead system.

The object of my invention is to provide a strong, efficient device which will withstand the excessive strains placed upon devices of this character, and which strains are increasing quite rapidly due to development in overhead construction with respect to trolley bus operation.

My invention resides in the new and novel construction, combination and relation of the parts described in the specification and shown in the accompanying drawings.

In the drawings—

Fig. 1 is a side view of my invention.

Fig. 2 is one end view of my invention with a modified form of attachment.

Fig. 3 is a side view of the end member only used in the device shown in Fig. 1.

Fig. 4 is an end view of Fig. 3.

Fig. 5 is an enlarged longitudinal sectional view of the end member shown in Figs. 1 and 3.

Fig. 6 is an elevational view in partial section of the compression member employed in Fig. 1 and later described.

Fig. 7 is an elevational view in partial section of the tension member which is shown in Fig. 1 and later described.

Figure 8:
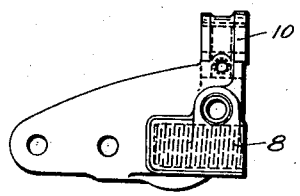
Fig. 8 is a side view of the end member alone shown in Fig. 2.

In the construction of overhead trolley systems, it is necessary to sectionalize the trolley wire and it is also necessary to cross wires of opposite polarity and maintain them in substantially the same horizontal plane.

With the stresses which these devices must meet with the ever changing development in overhead systems, it is necessary that these devices shall be not only light, but very strong.

Where two wires of opposite polarity cross each other, it is necessary to employ a sectional or insulating device, and I have so arranged my invention as to be applicable to this purpose as well as that of sectionalizing a single trolley wire.

In the preferred embodiment of my invention for sectionalizing a single trolley wire, I employ two end members 1 spaced apart and provided with a longitudinal groove 2 to receive the ends of the trolley wire 3.

I prefer, as far as possible, to prevent bending the trolley wire and provide holding means or screws 4 adjustably mounted in the threaded openings 5 to interlock with the trolley wire to hold the same against withdrawal in service. At the end of the member 1, I provide a holding screw 6 positioned in the threaded opening 7 which checks the travel of vibrations at the end of the end casting, which I have found to materially increase the life of the trolley wire at this point.

The end casting is provided with a threaded socket 8 and I prefer to have one end socket threaded righthand and the other threaded lefthand to receive the tension member 9 shown in Fig. 7 and hold the end members in predetermined spaced relation and subject to adjustment.

The end members 1 are also provided with through openings 10 to receive the bolts 11 which interlock with the compression member 12 of insulating material shown in Fig. 6.

Mounted on the member 12 is a supporting clamp 13 which may be secured to an overhead hanger or other supporting arrangement.

Positioned between the end members at the lower sides thereof is an insulating bridging member 14, the lower surface of which is in alignment with the lower surface of the trolley wires 3. The bridging member is held in position by means of a loop member 15 secured to the end member by the bolt 16 extending through the opening 17 in the end member. The ends of the bridging member 14 are provided with projections 18 which overlap the lower portion or bight 19 of the loop member 15.

In Fig. 2 I have shown the end portion only of the arrangement described in Fig. 1 excepting that the end casting 25 is provided with a tongue 26 and openings 27 by means of which the device may be combined with other parts to vary the combination required in overhead construction.

The tension member 9 is an insulating member and comprises an inner longitudinal rod 30 provided with threads for a distance along each end or throughout the length of the rod, and this rod is encased in an insulating covering 31 which interlocks with the threads on the rod 30.

I prefer to form the covering 31 upon the rod by winding thereon sheet insulating material impregnated with an insulating and weatherproof binder. By so doing, the inner layers of the casing 31 would be thoroughly interlocked with the threads on the rod 30. The insulating material may be of paper or material impregnated with shellac, or copal varnishes or with approved synthetic resins such as "bakelite" a phenolic condensation resin.

The rod 30 does not extend entirely to the ends of the casing 31 and a plug 32 is inserted in each end and either held by threading or by cement. This construction provides a tension member of high insulating value and mechanical strength. The opposite ends of the casing 31 for a predetermined distance back are threaded righthand and lefthand respectively to cooperate with the threads in the socket 8. Thus the end members 1 are securely held in a predetermined position even though subjected to severe strains mechanically, and through the medium of the right and left hand threads the spacing of the end members may be adjusted by rotating the tension member 9.

The construction of the tension member 9 offers a member of unusual strength, insulation throughout its length, of small diameter and of minimum weight in comparison to its strength; the insulating casing of "bakelite" or phenolic resins has unusual strength and insulating properties and a wall of less thickness than the diameter of the rod 30.

The compression member may consist of an elongated rod of insulating material, either solid or tubing, and preferably of canvas or paper fibre impregnated with copal varnish or synthetic gums or resins, although the rod may be of wood if desired.

The ends of the rod 12 are threaded to receive the cap screws or bolts 11. The compression rod 12 is placed between the inner faces 20 of the end members and held in position by means of the bolts 11.

The member 14 may be formed from wood, fibre, rubber, Bakelite, canvas, etc.

Figure 9:
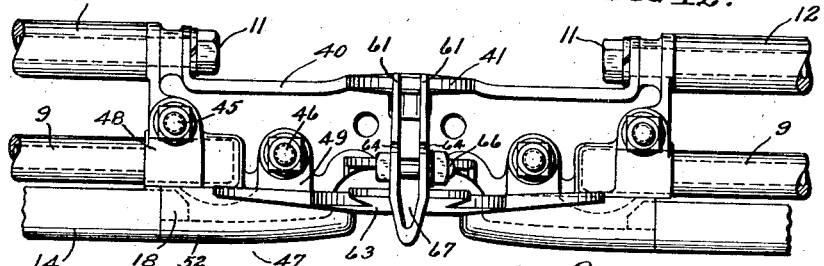
Fig. 9 is an arrangement of my invention shown in Fig. 1 for supporting trolley wires crossing at an angle.

By substituting for the end member 1 a modified form of end member arranged to provide double insulation, as shown in Fig. 9, I am able to use my invention to permit the crossing of two trolley wires of opposite polarity.

Figure 10:
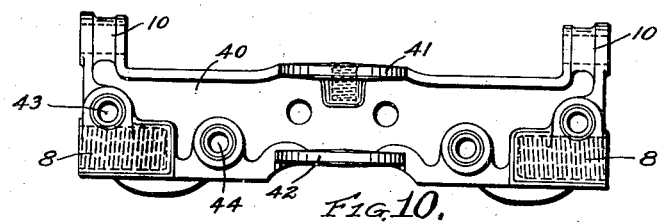
Fig. 10 is a side view of the connecting member shown in Fig. 9.
Figure 11:
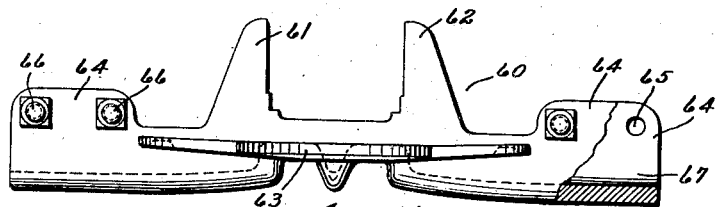
Fig. 11 is a wire supporting member shown in Fig. 9.
Figure 15:
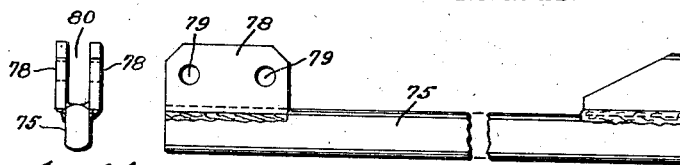
Figs. 14 and 15 are end views respectively of Fig. 13.

The end member 40, as shown in Figs. 9 and 10, is provided with the threaded sockets 8 and through openings 10 to receive the tension member 9 and compression member 12 respectively. The attachment of the members 9 and 12 to the member 40 is the same as described with relation to the end members 1 in Fig. 1.

The member 40 is also provided with an upper circular disc 41 and a lower circular disc 42 and through openings 43 and 44 to receive the bolts 45 and 46 respectively to hold the clip 47 in position.

Figure 12:
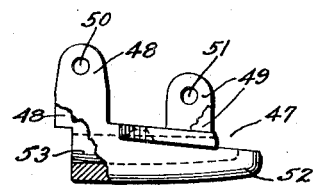
Fig. 12 is a clip member shown in Fig. 9 for holding in assembled relation the parts shown in Figs. 10 and 11.

The clip 47, shown in Fig. 12, is provided with two spaced lugs 48 and two spaced lugs 49 provided with registering openings 50 and 51 respectively. The spaced lugs 48 and 49 receive therebetween the ends of the member 40 and the body portion 52 is formed with a longitudinal slot 53 which receives and supports the projecting end 18 of the bridging member 14.

Figure 16:
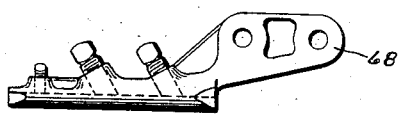
Fig. 16 is a side view of a trolley wire tip.

Associated with the member 40 is a member 60 which has two pairs of spaced lugs 61 and 62 and the pairs of lugs are spaced to receive therebetween the circular discs 41 and 42 which brace the member 60 against buckling. The member 60 is provided with a circular disc 63 and this disc is engaged on its lower face by the projection 52 of the clip 47 which holds the member 60 up in position with respect to the member 40 and permits the member 60 to pivot relative to the member 40 to adjust the parts to the angle of the crossing trolley wires. The member 60 is provided with spaced lugs 64 with registering openings 65 therethrough to receive the bolt 66 and forming between the lugs 64 a slot 67. The ends of the member 60 may have positioned in the slots 67 a trolley wire holding tip, as shown in Fig. 16, which is provided with a tongue 68 to fit between the lugs 64 and held in position by means of the bolts 66. The trolley wire tip is also provided with a groove to receive the trolley wire and holding means, as shown in Figs. 2 and 5.

Figures 13, 14:
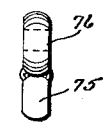
Fig. 13 is a view in elevation of a spacer used in combination with the device represented in Fig. 2 and the part shown in Fig. 11.

If it is desired to also insulate the trolley wire from the members 40 and 60, as by means of a device similar to that shown in Fig. 1, I employ the spacer shown in Fig. 13 which consists of a rectangular bar 75 of predetermined length having a projecting tongue 76 at one end provided with the openings 77 and provided with spaced lugs 78 having registering openings 79 and forming a groove 80. The tongue 76 is arranged to be positioned in the groove 67 of the member 60 and be secured thereto by means of the bolts 66 passing through the openings 77, and the insulating member shown in Fig. 1 but equipped with an end member as shown in Fig. 2 would have the projecting tongue 26 positioned in the groove 80 and held in position by bolts passing through the registering openings 27 and 79. This combination is often desirable where it is necessary to place a sectionalizing insulator in the crossing trolley wire at a distance from the point of crossing. Also for a short coupling, the tongue 26 shown in Fig. 2 may be positioned in the groove 67 and held in place by the bolts 66.

There are many modifications which my invention will lend itself to and, therefore, I wish to be limited only by my claims.

I claim:

1. A tension member for a trolley wire device comprising a metal rod, an insulating covering for the entire surface of the rod and having a lower specific tensile strength than that of the metal rod, means interlocking the ends of the rod to the inner surface of the covering, the outer surface of the ends of the covering being threaded right and left hand respectively to interlock with threads on the said device, the threading on the ends of the covering overlapping the interlock between the rod and covering.

2. A tension member for a section insulator comprising in combination, an elongated tube of insulating material, a central core of metal extending to a point adjacent to each end of the tube and having its ends interlocked with the tube, plugs of insulating material positioned in the ends of the tube and sealing the same and right and left hand threads at the ends of the tube respectively to interlock with parts of a section insulator to hold the parts in a fixed spaced relation and to adjust the separation of the parts when the tension member is rotated.

3. A trolley wire device comprising a pair of spaced end members, each provided with a socket and a longitudinal groove to receive and hold a trolley wire, elongated tension insulating means having its ends rotatably seated in the sockets, means on the ends of the tension means cooperating with means within the sockets to prevent separation of the end members and to move the end members towards or away from each other when the tension means is rotated in one direction or the other, the tension means comprising an elongated metal rod entirely enclosed by insulating material with the ends of the metal rod interlocked with the insulating material and all parts of the tension means rotatable as a unit, a compression insulating member interposed between the end members and an insulating bridging member held between the end members to guide a current collector across the device.

4. A sectionalizing device for use in an overhead system comprising a pair of spaced end members, each member provided with a threaded socket and projecting means adapted for attachment to other elements forming part of the overhead system, an elongated rotatable tension insulating means having threaded ends seated in the sockets and cooperating with the threads in the sockets to prevent separation of the end members and to adjust the separation of the end members when the tension means is rotated, the tension means comprising an elongated metal rod entirely enclosed by insulating material and interlocked with the rod along the surface of the rod adjacent its ends, an insulating compression member interposed between the end members and an insulating bridging member held between the end members to guide a current collector across the device.

5. A trolley wire sectionalizing device comprising a metal rod, an insulating covering for the entire surface of the rod, the covering having a lower specific tensile strength than that of the rod, means interlocking the ends of the rod to the inner surface of the covering, the outer surface of the covering at the ends thereof being threaded right and left hand respectively, the threading on the ends of the covering overlapping the interlock between the rod and covering, spaced end members each provided with a threaded socket in which is seated a threaded end of the covering, means on each end member to receive and hold a trolley wire end, auxiliary insulating means under compression to assist in holding the end members in spaced relation and insulating means to guide a current collector from one end member to the other end member.

6. A tension member for a section insulator comprising in combination, an elongated tube of insulating material having closed ends of insulating material, a central core of metal extending to a point adjacent to each end of the tube and having its ends interlocked with the tube and right and left hand threads at the ends of the tube respectively to interlock with parts of a section insulator to hold the parts in a fixed spaced relation and to adjust the separation of the parts when the tension member is rotated.

7. A trolley wire sectionalizing device for overhead construction comprising a pair of spaced end members, each member provided with a socket, elongated tension insulating means having its ends rotatably seated in the sockets, means at the ends of the tension means cooperating with means within the sockets to prevent separation of the end members and to adjust the spacing of the end members when the tension member is rotated, the tension means comprising an elongated metal rod entirely enclosed by insulating material with the ends of the rod interlocked with the insulating material and all parts of the tension means rotatable as a unit, a compression insulating member interposed between the spaced members to assist in holding the spaced members in position, an insulating bridging member held between the end members and having a contact surface to be engaged by a current collector to guide the collector across the device and means associated with each spaced member to receive and hold a trolley wire and without bending the wire and without concealing the entire surface of that portion of the wire associated with the holding member and to maintain the exposed surface in alignment with the contact surface of the bridging member.

8. A sectionalizing device in an overhead system comprising a metal rod, an insulating casing of fibrous material impregnated with a synthetic resin and having a lower tensile strength than that of the rod and covering the entire longitudinal surface of the rod, insulating means closing the ends of the tubular casing, means interlocking the rod to the inner surface of the casing, the outer longitudinal surface of the casing at the ends thereof being threaded, the threading on the ends of the casing overlapping the interlock between the casing and the rod, spaced members each provided with threaded means cooperating with a threaded end of the casing to hold the members in spaced relation, each member also provided with endwise projecting means to secure the device in position as an element in an overhead system, auxiliary insulating means disposed between the spaced members to assist in holding the members in spaced relation and insulating means to guide a current collector from one member to the other member.

9. A sectionalizing device for an overhead system comprising a pair of spaced members, each provided with a socket and means for making an attachment to the member, elongated tension insulating means having its ends rotatably seated in the sockets, means on the ends of the tension means cooperating with means within the sockets to prevent separation of the end members and to move the end members towards or away from each other when the tension means is rotated in one direction or the other, the tension means comprising an elongated metal rod entirely enclosed by insulating material with the ends of the metal rod interlocked with the insulating material and all parts of the tension means rotatable as a unit, a compression insulating member interposed between the end members and an insulating bridging member held between the end members to guide a current collector across the device.

10. A tension member for a trolley wire device comprising a metal rod, an insulating casing comprising a tubular member of superimposed layers of fibrous material impregnated with a phenolic condensation product, the casing covering the entire longitudinal surface of the rod, insulating means closing the ends of the tubular member, means interlocking the ends of the rod to the inner surface of the casing adjacent the ends thereof, the outer longitudinal surface of the casing at the ends thereof being threaded, the threading on the ends of the casing overlapping the interlock between the casing and the rod and adapted to interlock with the threads on the said device, the metal rod extending throughout substantially the entire length of the casing and relieving the insulating casing from a portion of the stress to which it would otherwise be subjected in use.

11. A tension member for a trolley wire device comprising a metal rod, a tubular casing comprising a plurality of superimposed layers of fibrous material impregnated with a synthetic resin, covering the entire surface of the rod, insulating means closing the ends of the casing, means interlocking the ends of the rod to the inner surface of the casing adjacent the ends thereof, the outer longitudinal surface of the casing at the ends thereof being threaded, the threading on the ends of the casing overlapping the interlock between the casing of the rod, the metal rod extending throughout substantially the entire length of the casing and relieving the casing from some of the stress to which it is subjected in use.

12. A sectionalizing device for use in an overhead system comprising a pair of spaced end members, each member provided with a threaded socket and projecting means adapted for attachment to other elements forming a part of the overhead system, an elongated tension insulating member having threaded ends seated in the sockets and cooperating with the threads in the sockets to permit relative rotation of the tension member and the end members and prevent separation of the end members and whereby the separation of the end members may be adjusted when the end members and the tension member are rotated relative to each other in a proper direction, the tension member comprising an elongated metal rod having its longitudinal surface entirely enclosed by a tubular insulating covering of fibrous material impregnated with a synthetic resin and interlocked with the rod along the surface of the rod adjacent its ends, an insulating compression member interposed between the end members and an insulating bridging member held between the end members to guide a current collector across the device.

SAMUEL S. MATTHES.